United States Patent [19]

Simpson

[11] Patent Number: 5,120,167
[45] Date of Patent: Jun. 9, 1992

[54] BORING APPARATUS

[75] Inventor: Alexander Simpson, Muckhart, Scotland

[73] Assignee: Forth Tool & Valve Limited, Fife, Scotland

[21] Appl. No.: 737,552

[22] Filed: Jul. 25, 1991

Related U.S. Application Data

[63] Continuation of Ser. No. 475,932, Feb. 6, 1990, abandoned.

[30] Foreign Application Priority Data

Feb. 7, 1989 [GB] United Kingdom ............... 8902717

[51] Int. Cl.⁵ .................................................. B23B 3/26
[52] U.S. Cl. ..................................... 408/158; 82/1.2; 82/1.4; 82/131; 408/153
[58] Field of Search .......................... 407/45, 73–78, 407/88; 408/153, 158, 168, 170, 169; 82/1.2, 1.3, 1.4, 131

[56] References Cited

U.S. PATENT DOCUMENTS

| Re. 32,211 | 7/1986 | Jerue et al. ............... 82/1.2 |
| 1,684,772 | 9/1928 | Manning . |
| 4,508,475 | 4/1985 | Peuterbaugh ............... 408/153 |
| 4,617,846 | 10/1986 | Horsch ............... 82/1.2 |

FOREIGN PATENT DOCUMENTS

| 0111787 | 6/1984 | European Pat. Off. . |
| 813919 | 9/1951 | Fed. Rep. of Germany . |
| 1028853 | 4/1958 | Fed. Rep. of Germany . |
| 2025006 | 4/1971 | Fed. Rep. of Germany . |
| 2012643 | 10/1971 | Fed. Rep. of Germany . |
| 3245195A1 | 6/1984 | Fed. Rep. of Germany . |
| 3246994A1 | 6/1984 | Fed. Rep. of Germany . |
| 967093 | 10/1950 | France . |
| 1038110 | 9/1953 | France . |
| 391980 | 6/1933 | United Kingdom . |
| 1573194 | 8/1980 | United Kingdom . |
| 2131332A | 6/1984 | United Kingdom . |
| 2204513A | 11/1988 | United Kingdom . |

Primary Examiner—Steven C. Bishop
Attorney, Agent, or Firm—Pravel, Gambrell, Hewitt, Kimball & Krieger

[57] ABSTRACT

A boring apparatus comprises an elongate support body adapted to be rotatable by a machine tool spindle, a cutter mounting body releasably securable to the end of the support body remote from the machine tool spindle and is provided with a cutter guide which slidably receives a cutter therein which is constrained by the guide to be displaceable in an adjustment direction inclined to the rotational axis of the elongate support body. An adjustment member is disposed within the elongate support body and is movable along an axis substantially coaxial with the rotational axis of the elongate support body, and an interengaging coupling on the adjustment member and on the cutting tool is provided whereby movement of the adjustment member along its axis of motion induces movement of the cutting tool in its adjustment direction.

21 Claims, 4 Drawing Sheets

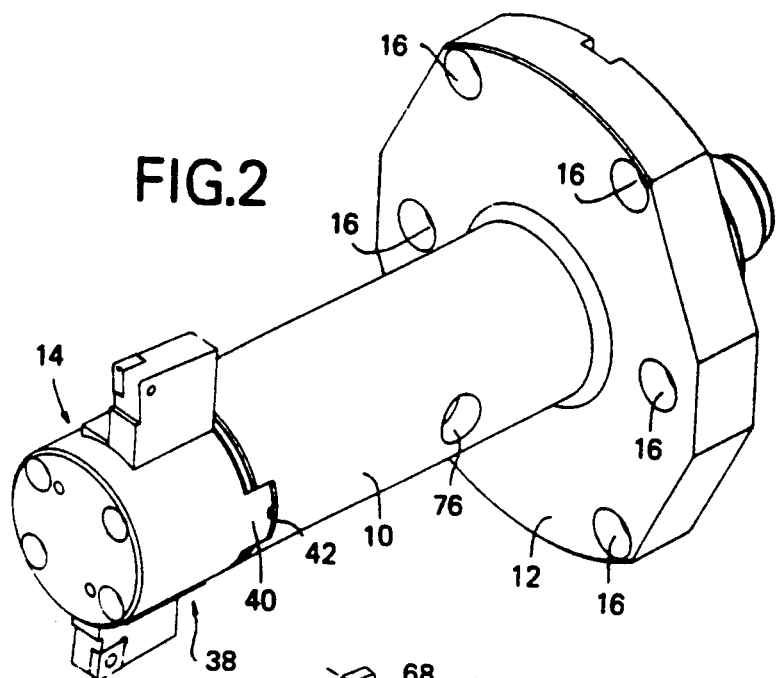
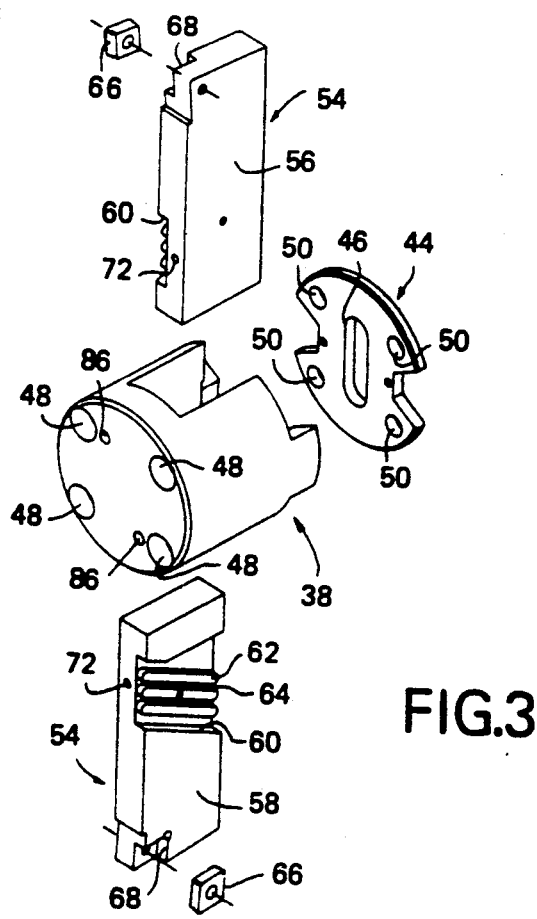

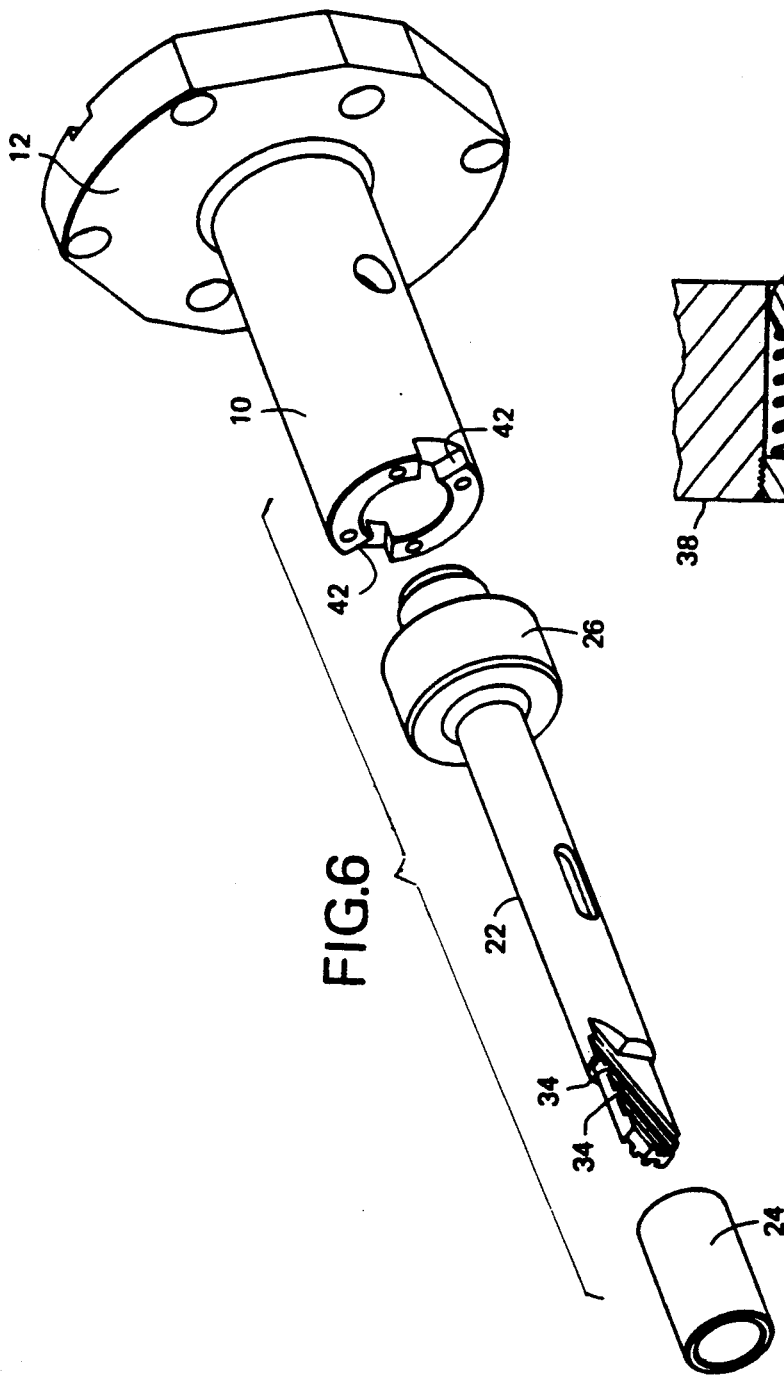
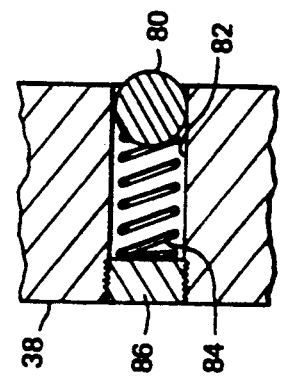

BORING APPARATUS

This is a continuation of co-pending application Ser. No. 07/475,932 filed on Feb. 6, 1990, now abandoned.

The present invention relates to a boring apparatus, and in particular to a boring apparatus which is connectible to a machine tool.

BACKGROUND OF THE INVENTION

One widely-used type of precision boring apparatus comprises a rotatable boring bar, which is attached to and rotatable by, a machine tool spindle. One or more cutting blocks of a given size are connected to the free end of the boring bar, in order to be able to machine a bore of a given diameter. Thus, when it is desired to produce a bore of a different diameter, it is necessary to stop the rotation of the machine tool and to replace the or each cutting block with a different block or blocks to produce a bore of a different diameter. This is very inconvenient, since it requires the provision of a set of many different cutting blocks of different sizes, which is very costly, and which takes up much room in storage. Furthermore, the replacement of the cutting blocks must be performed by a skilled operator, in order that the new cutting block may be correctly set. The stopping of the cutting machine, the replacement of cutting blocks and the recalibration, if necessary, obviously takes a considerable amount of time, and this time is considerably increased when it is realized that for each bore, it is usually necessary to bore in a plurality of stages, usually a roughing stage, a semi-finishing stage and a finishing stage.

It is known to provide boring systems with radially-adjustable cutting blocks. The simplest versions include a manually rotatable adjustment member which screw-threadedly engages an actuating member whose subsequent displacement is used to displace a cutting block radially by means of interengaging splines and grooves on the cutting block and the actuating member, the splines and grooves being inclined to the displacement direction of the actuating member. It is believed that examples of this are shown in U.S. Pat. No. 1,684,772, GB 2,204,513 A, FR 967,093, FRI, 038,110, DE 813,919, DE 3,245,195 A1 and DE 2,012,643. A similar arrangement is shown in GB 2,131,332 A, but wherein the adjustment is effected automatically, for example by means of a stepping motor.

However, these devices all suffer from two major disadvantages. Firstly, the adjustment of the cutting diameter can only be effected when the tool is stationary, this making it impossible to produce gradually varying "profiled" bores such as tapered bores. Secondly, and more significantly, each arrangement is only able to produce bores over a given cutting diameter range. In order to produce bores of a diameter outside that range, it is necessary to fit a different cutting block, which necessitates a complicated and time consuming dismantling and subsequent reassembly and recalibration of the cutting apparatus.

It has been found possible to overcome the first of the aforementioned disadvantages by providing an actuating member which is slidably disposed in a mounting tube which also slidably receives the or each cutting block in a groove formed therein. One example is disclosed in DE 2,025,006 A, and it is believed that DE 1,028,853 discloses other examples.

Although the devices can produce profiled bores, each cutting block is still able only to produce bores over a given range of diameters, and time-consuming and skilled dismantling of the assembly is necessary in order to replace one cutting block with another of a different cutting range. This is only made more difficult by the mount of the actuating member within the mounting tube.

U.S. Pat. No. 4,508,475 also discloses a similar actuating mechanism, but the mechanism merely withdraws a grooving tool to an inoperative position and extends it to an operative position when desired. However, the same disadvantages are present with this device.

It is an object of the present invention to provide a boring apparatus which overcomes the disadvantages described above.

In accordance with the present invention there is provided a boring apparatus comprising:

an elongate support body adapted to be rotatable by a machine tool spindle;

first securing means for releasably securing said elongate support body to said machine tool spindle;

a cutter support body releasably securable to the end of said elongate support body remote from said machine tool spindle;

second securing means for releasably securing said cutter support body to said end of said elongate support body;

cutting tool guide means in said cutter support body;

a cutter tool slidably disposed in said cutter guide means are restricted by said guide means to be displaceable in an adjustment direction inclined to the rotational axis of said elongate support body as dictated by the guide means;

an adjusting member disposed within said elongate support body and being movable along an axis which is substantially coaxial with the rotational axis of said elongate support body; and an interengaging coupling on said adjusting member and said cutter tool whereby movement of said adjusting member along its said axis of motion induces movement of said cutter tool in said adjustment direction.

Such an arrangement, with the cutter or cutters located in modular fashion to a cutter support body, allows the cutter support body and cutters to be removed from the elongate support body as a whole, and does not necessitate dismantling of the cutters. In order to be able to cut bores of a different diameter range, it is merely necessary to remove the cutter support body, housing the cutters, and to replace it with a different support body having cutters capable of boring a different range of diameters.

Preferably, the cutter guide is provided in the cutter support body, and in a preferred embodiment it is adapted to receive two cutters. The two cutters may be in slidable engagement with each other.

The cutter support body may further comprise a retaining washer which is releasably securable to the main cutter support body portion. The retaining washer may be provided with passage means for the passage of a portion of the cutter adjustment member.

In a preferred embodiment, the adjustment direction is substantially perpendicular to the rotational axis of the elongate support body.

The cutter adjustment member preferably extends out of, or is extensible out of, the elongate support body within which it is located. This greatly assists the removal and fitting of cutter support bodies and their associated cutters.

The apparatus is preferably provided with securing means for releasably connecting the cutter adjustment member to a machine tool spindle.

Preferably, retaining means are provided to retain the or each cutter in the cutter support body.

By way of example only, a specific embodiment of the present invention will now be described, with reference to the accompanying drawings, in which:

FIG. 2 is perspective view of the boring system of FIG. 1;

FIG. 3 is an exploded front perspective view of the cutting head assembly of the boring system of FIG. 1;

FIG. 6 is an exploded perspective view of part of the boring system of FIG. 1; and FIG. 7 is a cross-sectional side elevation of part of the assembled cutting head of FIG. 3.

Figure 1:
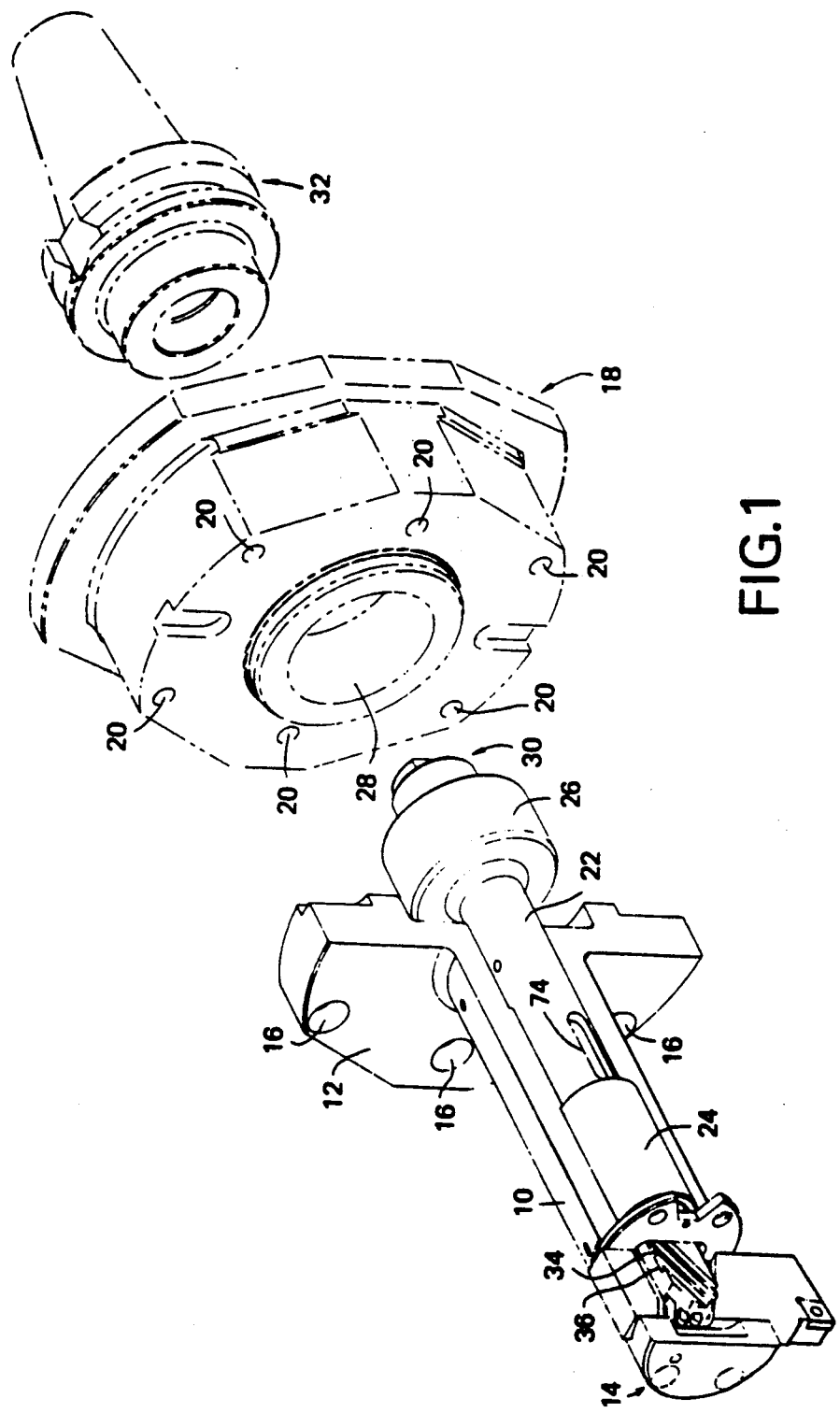
FIG. 1 is a perspective view, partly cut away, of a first embodiment of boring system in accordance with the present invention.

Referring to the figures, the boring system comprises a cylindrical shaft 10 which is provided with a locating flange 12 at one end and cutting means, generally designated as 14, at the opposite end. The locating flange is provided with six apertures 16 which are adapted to receive retaining bolts (not shown) whose heads are received in the apertures and whose threaded shanks are received in correspondingly-positioned threaded apertures in the spindle of a conventional cutting machine. In order that the invention can be fitted to a plurality of cutting machines, and in particular to a numerically controlled boring machine, an adapter 18, shown in chain dot in FIG. 1, may be provided, and in this case the adapter is secured to the cutting machine and the bolts passing through the apertures 16 in the flange 12 are received in correspondingly-positioned screw-threaded apertures 20 in the adapter.

Figure 5:
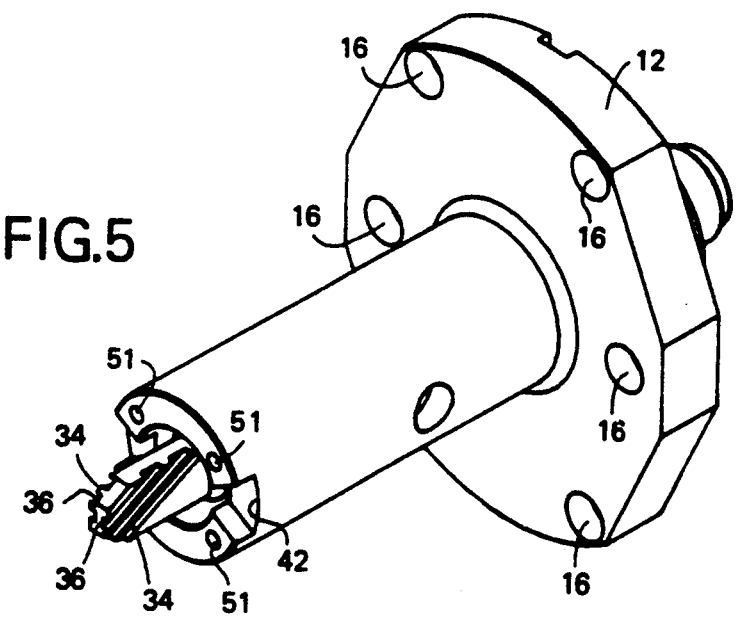
FIG. 5 is a front perspective view of the boring system of FIG. 1, with the cutting head assembly removed.

Referring in particular to FIGS. 1, 5 and 6, it will be seen that the cylindrical shaft 10 is hollow, and the interior of the hollow shaft is provided with a generally cylindrical actuator rod 22. The actuator rod 22 is constrained to be movable along the longitudinal axis of the cylindrical shaft 10, and for this purpose two cylindrical support bushes 24, 26 are located on the actuator rod 22. The first of the support bushes 24 is located within the hollow cylindrical shaft 10, and the second support bush 26 which is of a larger diameter than the first support bush 24 is adapted to be received in a correspondingly-shaped aperture 28 in the adapter 18. If an adapter 18 is not necessary, it may be possible to provide a second support bush which is adapted to fit within a corresponding aperture in the spindle of the cutting machine. Each of the bushings has a coating of FIBERSLIP (Trade Mark) which is a self-lubricating, low friction, PTFE-based coating manufactured by Ampep plc of Clevedon, England, and which produces self-lubricating, high loading, low friction bearings.

The end 30 of the actuator rod adjacent to the second support bush 26 is shaped to be received in a shank 32. The shank 32 has been shown in chain dot since the actual configuration of the shank will be adapted to suit the particular cutting machine. However, in a conventional way, the shank is received and secured in a receiving aperture of a conventional cutting machine, typically a 50 I.S.O. tapered entry. Such conventional cutting machines are adapted to be able to displace the shank along the rotational axis of the cutting machine, normally in order to displace a cutting head longitudinally. In the present case, such displacement will cause the actuator rod 22 to be displaced along this longitudinal axis.

The opposite end of the actuator rod 22 is not cylindrical, but rather is in the form of an actuator end having two generally parallel flat faces. Each face is provided with a plurality of parallel tongues 34 and grooves 36, and it will be noted that the longitudinal axes of the tongues and grooves are inclined to the elongate axis of the cylindrical shaft 10. It will be noted that the tonges and grooves on the opposite faces of the actuating end of the actuating rod 22 are inclined to the elongate axis of the shaft 10 in opposite directions, such that the tongues and grooves on one side rise from the free end of the actuator rod as shown in FIGS. 1, 5 and 6, and on the other side the tongues and grooves fall from the said free end. The tongues and grooves are coated with Apticote NEDOX (Trade Mark) which is a low wear, low friction, low corrosion coating produced by A.T. Poeton & Son Limited of Gloucester, England.

Referring to FIGS. 1 to 4, the cutting means 14 is in the form of a generally cylindrical support body 38 which is locatable on the free end of the shaft 10 by means of locating teeth 40 on the support body which are engagable with correspondingly-shaped grooves 42 formed in the end of the shaft 10. In use, a shaped washer 44 is located between the support body and the end of the shaft 10, and is secured thereto by means of two diametrically opposed bolts 45 whose threaded shanks are received in complementarily threaded bores in the support body. The washer is provided with an elongate slot 46 to allow the actuating head of the actuating rod 22 to pass therethrough, and the support body 38 and the washer 44 are securable on the end of the shaft 10 by means of bolts which pass through aligned apertures 48, 50 in the end of the support body 38 and in the washer 44 respectively, and into correspondingly-positioned screw-threaded apertures 51 in the end of the shaft 10.

The support body 38 is provided with a generally rectangular cutter block guide passage 52, whose elongate axis is perpendicular to the longitudinal axis of the shaft 10. The guide passage 52 is adapted to receive two identical cutter blocks 54. The cutter blocks are generally rectangular in cross section, and are provided with planar radially outer faces 56 which in use abut and slide against the faces of the guide passage 52 whose planes extend parallel to the elongate axis of the shaft 10, and against the inner face of the washer 44 which is secured to the body 38. The radially inner faces 58 of the cutter blocks are also generally planar, and are adapted slide against one another in use. It will thus be noted that the support body 38, the washer 44 and the two cutter blocks 54 form a self-contained unit which may be secured to, and removed from, the end of the shaft 10 as previously described, as a unit, i.e. without the necessity for dismantling the assembly.

It will be noted from the figures that the inner face of each cutter block 58 is provided with a recess 60, the bottom face of the recess being provided with a plurality of tongues 62 and grooves 64 for engagement with the grooves and tongues 36, 34 of the respective faces of the actuating portion of the actuator rod 22.

Thus, it will be noted that, as a result of the engagement of the tongues and grooves 34, 36 of the actuator rod 22 with the complementary grooves and tongues 64, 62 of each cutter block 54, the cutter blocks will be moved radially inwardly or outwardly depending upon the direction of movement of the actuator rod 22, since the cutter blocks 54 are constrained to move in the radial direction only.

Figure 4:
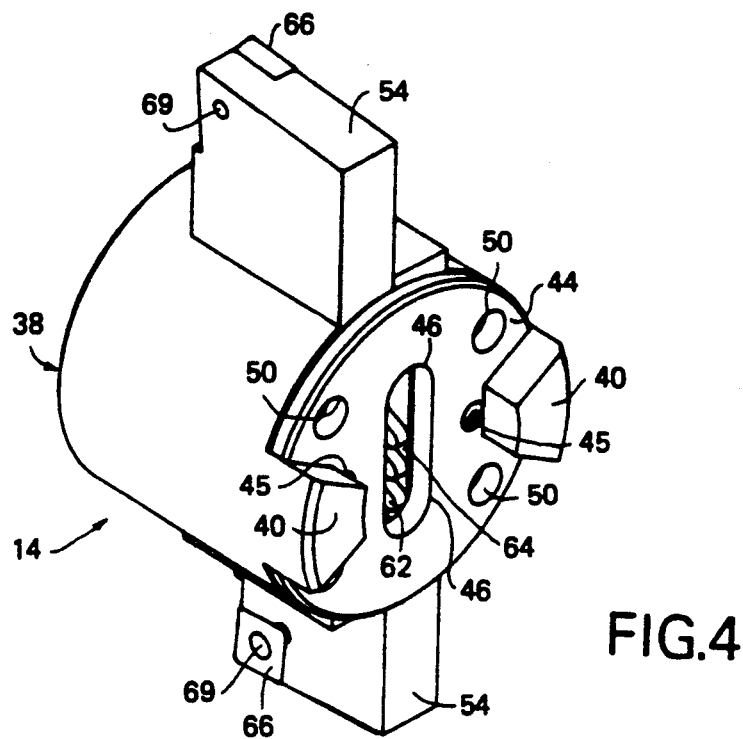
FIG. 4 is a rear perspective view of the assembled cutting head assembly of FIG. 3.

The actual cutting is achieved by conventional hard replaceable inserts 66 (such as tungsten carbide) which are releasably securable in respective grooves 68 in each cutter block 54 by means of a bolt 69 (FIG. 4). The cutting inserts are conventional, and will not be described hereinafter.

Thus, each cutting head assembly is capable of cutting holes having diameters within a given range, dependent on the size of the cutting blocks 54. In use, a plurality of pre-assembled cutting head assemblies of overlapping ranges would be provided, and the assembly having the appropriate cutting diameter range is selected and fitted to the end of the shaft 10. This is done by manoeuvring the cutting head assembly to locate the distal end of the actuating rod (which extends beyond the end of the shaft 10 when the cutting head assembly is removed, as shown in FIG. 5, thereby facilitating this operation in the slot 46 and to engage the tongues and grooves 34, 36 of the actuating rod with the grooves and tongues 64, 62 in the cutting blocks 54.

As the tongues and grooves are engaged further by pushing the assembly onto the end of the shaft 10 to engage the locating teeth 40 of the assembly with the recesses 42 on the shaft, the cutter blocks are automatically moved to the correct radial position for the given longitudinal position of the actuating rod 22, by virtue of the wedge action of the tongues and grooves. Thus, re-calibration of the cutting blocks is unnecessary, and fitting of the cutting head assembly is extremely rapid, accurate and does not require skilled labour.

In use, the desired cutting diameter within the range of diameters for a given assembly is set by moving the actuator rod 22 in its longitudinal direction. Movement of the actuator rod 22 away from the cutting means 14 causes the cutting blocks to be drawn radially inwards, whereas movement of the actuator rod 22 in the opposite direction causes radially outward movement. By suitable adjustment of the actuator rod 22, as moved by the shank connected to the numerically controlled machine tool, the desired cutting diameter may be accurately controlled. Indeed, by suitable calibration of the cutting machine, the cutting diameter may be set automatically by entering the required diameter, which produces a corresponding known displacement of the actuator rod and hence corresponding radial movement of the cutter blocks 54.

Each cutting head assembly comprising two cutter blocks 54 a support body 38 and a washer 44 secured to the support body 38 can thus be used to bore holes having diameters over a fixed range, and the actual diameter may be easily and accurately varied. If the required diameter is outside the range required, it is a simple matter to replace the cutting head assembly as a unit, and replace it with an assembly having cutter blocks which are either large or smaller to provide a different range of diameters. In this regard, it will be noted that, as the support body 38 is removed from the end of the shaft 10, it will cause the cutter blocks 54 to be drawn radially inwardly to their minimum diameter. In this position, spring-loaded ball bearings 80 located in axial bores 82 in the support body 38 seat themselves in part-spherical recesses 72 located in the edge of the cutter blocks 54, to retain the cutter blocks at their minimum diameter positions, and to prevent them from falling out of the support body 38. The ball bearings are acted upon by respective compression springs 84 having a 10 lb pre-load, and one end of the bore is closed off by a grub screw 86. The cutting head assemblies not in use are thus stored in this configuration, making the subsequent attachment of a desired assembly very rapid and accurate. Damage to the apparatus by excessive movement of the actuator rod 22 may be prevented by providing the actuator rod 22 with an axial extending slot 74. A peg (not illustrated) may then be releasably secured in a bore 76 in the shaft 10, thereby limiting the axial movement of the actuator rod 22.

It will be noted that, as a result of the rapid and accurate variation of the diameter which is possible with the present invention, it will be possible to machine profiled objects in a single machining operation. Also, it is envisaged that, by a suitable measurement feedback system, a computer-controlled machine tool will be able to vary the position of the cutter blocks 54 to compensate for wear of the cutting inserts 66 during machining, thereby obtaining a truly accurate diameter of bore, even when wear of the inserts 66 takes place. It should also be noted that this invention is not restricted to use with horizontal boring machines, but may be adapted with other cutting machines, such as vertical axis cutting machines.

As mentioned previously, the present invention is particularly useful not only for straightforward boring and threading operations, but is also particularly useful for producing contours, where gradual and continuous variation of cutting diameter is required. The use of two cutters also produces greater accuracy, and at the same time allows increased cutting speeds and higher feed rates.

I claim:

1. A boring apparatus comprising:
   an elongate support body adapted to be rotatable by a machine tool spindle;
   first securing means for releasably securing said elongate support body to said machine tool spindle;
   an adjusting member disposed within said elongate support body and being movable along an axis which is substantially coaxial with the rotational axis of said elongate support body;
   coupling means on a first end of said adjusting member adapted to be releasably securable to an adjusting portion of said spindle which is extensible and retractable along said rotational axis in order to advance and retract respectively said adjustment member along said rotational axis;
   a first coupling component on a second end of said adjusting member opposite to said first end;
   a cutter support body releasably securable to the end of said elongate support body remote from said machine tool spindle;
   second securing means for releasably securing said cutter support body to said end of said elongate support body;
   cutter guide means in said cutter support body;
   a cutter slidably disposed in said cutter guide means and restricted by said guide means to be displaceable along an adjustment axis inclined to the rotational axis of said elongate support body as dictated by said guide means;

a second coupling component on said cutter releasably engageable with said first coupling component on said ajusting member, whereby movement of said adjusting member along its said axis of motion induces movement of said cutter along said adjustment axis, and whereby removal of said cutter support body from said end of said elongate support body disengages said first and second coupling components of said adjusting member and said cutter respectively.

2. A boring apparatus as claimed in claim 1, wherein said cutter support body is adapted to receive two cutters.

3. A boring apparatus as claimed in claim 2, wherein the two said cutters are in slidable engagement with each other.

4. A boring apparatus as claimed in claim 1, wherein said cutter support body further comprises a retaining washer which is releasably securable to the main cutter support body portion.

5. A boring apparatus as claimed in claim 4, wherein said retaining washer is provided with passage means for the passage of a portion of said cutter adjustment member.

6. A boring apparatus as claimed in claim 1, wherein said adjustment direction is substantially perpendicular to said rotational axis of said elongate support body.

7. A boring apparatus as claimed in claim 1, wherein said cutter adjustment member extends out of, or is extensible out of, said elongate support body within which it is located.

8. A boring apparatus as claimed in claim 1, comprising securing means adapted to releasably connect said cutter adjustment member to a machine tool spindle.

9. A boring apparatus as claimed in claim 1, wherein said first and second coupling components comprise tongues which are slidably disposed in grooves, said tongues and grooves being inclined to the axis of the adjustment direction and to the direction of motion of the or each cutter adjustment member.

10. A boring apparatus as claimed in claim 1, comprising retaining means to retain the or each said cutter in said cutter support body.

11. A boring apparatus as claimed in claim 10, wherein said retaining means comprises a detent mechanism.

12. A boring apparatus comprising:
an elongate support body adapted to be rotatable by a machine tool spindle;
first securing means for releasably securing said elongate support body to said machine tool spindle;
an adjusting member disposed within said elongate support body and being movable along an axis which is substantially coaxial with the rotational axis of said elongate support body;
coupling means on a first end of said adjusting member adapted to be releasably securable to an adjusting portion of said spindle which is extensible and retractable along said rotational axis in order to advance and retract respectively said adjustment member along said rotational axis;
a first coupling component on a second end of said adjusting member opposite to said first end;
a cutter support body releasably securable to the end of said elongate support body remote from said machine tool spindle;
second securing means for releasably securing said cutter support body to said end of said elongate support body;
cutter guide means in said cutter support body;
two cutters slidably disposed in said cutter guide means and restricted by said guide means to be displaceable in opposite directions parallel to an adjustment axis inclined to the rotational axis of said elongate support body as dictated by said guide means;
a second coupling component on each of said cutters releasably engageable with said first coupling component on said adjusting member, whereby movement of said adjusting member along its said axis of motion induces movement of said cutter along said adjustment axis, and whereby removal of said cutter support body from said end of said elongate support body disengages said first and second coupling components of said adjusting member and said cutters respectively.

13. A boring apparatus as claimed in claim 12, wherein the two said cutters are in slidable engagement with each other.

14. A boring apparatus as claimed in claim 12, wherein said cutter support body further comprises a retaining washer which is releasably securable to the main cutter support body portion.

15. A boring apparatus as claimed in claim 14, wherein said retaining washer is provided with passage means for the passage of a portion of said cutter adjustment member.

16. A boring apparatus as claimed in claim 12, wherein said adjustment direction is substantially perpendicular to said rotational axis of said elongate support body.

17. A boring apparatus as claimed in claim 12, wherein said cutter adjustment member extends out of, or is extensible out of, said elongate support body within which it is located.

18. A boring apparatus as claimed in claim 12, comprising securing means adapted to releasably connect said cutter adjustment member to a machine tool spindle.

19. A boring apparatus as claimed in claim 12, wherein said first and second coupling components comprise tongues which are slidably disposed in grooves, said tongues and grooves being inclined to the axis of the adjustment direction and to the direction of motion of the or each cutter adjustment member.

20. A boring apparatus as claimed in claim 12, comprising retaining means to retain the or each said cutter in said cutter support body.

21. A boring apparatus as claimed in claim 20, wherein said retaining means comprises a detent mechanism.

* * * * *